US009900047B2

(12) United States Patent
Jayasimha et al.

(10) Patent No.: US 9,900,047 B2
(45) Date of Patent: Feb. 20, 2018

(54) MULTI-CHANNEL SPREAD SPECTRUM RETURN CHANNEL FOR ULTRA SMALL APERTURE TERMINALS (USATS)

(71) Applicant: Global Eagle Entertainment Inc., Los Angeles, CA (US)

(72) Inventors: Sriram Jayasimha, Bangalore (IN); Jyothendar Paladugula, Hyderabad (IN); Abel Avellan, Miami, FL (US); Federico Fawzi, Miramar, FL (US)

(73) Assignee: Global Eagle Entertainment Inc., Los Angeles, CA (US)

( * ) Notice: Subject to any disclaimer, the term of this patent is extended or adjusted under 35 U.S.C. 154(b) by 0 days.

(21) Appl. No.: 15/375,669

(22) Filed: Dec. 12, 2016

(65) Prior Publication Data
US 2017/0302330 A1    Oct. 19, 2017

Related U.S. Application Data

(60) Provisional application No. 62/322,009, filed on Apr. 13, 2016.

(30) Foreign Application Priority Data

Oct. 13, 2016   (IN) .............................. 201611035045

(51) Int. Cl.
*H04B 1/707*    (2011.01)
*H04B 7/212*    (2006.01)
(Continued)

(52) U.S. Cl.
CPC .............. *H04B 1/707* (2013.01); *H04B 7/12* (2013.01); *H04B 7/18513* (2013.01);
(Continued)

(58) Field of Classification Search
CPC ....... H04L 27/3872; H04B 1/16; H04B 1/525; H04B 5/0031; H04B 5/0062; H04B 1/707; H04B 7/212
See application file for complete search history.

(56) References Cited

U.S. PATENT DOCUMENTS 5,272,446 A    12/1993 Harvey et al.
5,379,320 A    1/1995 Roosevelt et al.
(Continued)

OTHER PUBLICATIONS

European Intellectual Property Office, European Search Report for Application No. 17165431.2, dated Sep. 4, 2017, 7 total pages.

*Primary Examiner* — Janice Tieu
(74) *Attorney, Agent, or Firm* — SoCal IP Law Group LLP; Jonathan Pearce; Steven C. Sereboff

(57) ABSTRACT

A return channel system for ultra-small aperture terminals has a spreader that receives an input signal and outputs a spread spectrum signal having multiple replicated signals with a lower power than the input signal. A de-spreader includes a de-multiplexer that receives the spread spectrum signal via satellite. The de-multiplexer separates the spread spectrum signal into a first channel having a first signal and a second channel having a second signal. The de-spreader also has an offset compensation circuit having a phase estimator configured to estimate a phase offset between a phase of the first signal and a phase of the second signal. And a phase adjustor that receives the second signal and adjusts the phase of the second signal to align with the phase of the first signal to provide a phase-adjusted second signal. A summer combines the first signal with the phase-adjusted second signal to provide a composite signal.

26 Claims, 10 Drawing Sheets

(51) Int. Cl.
*H04B 7/12* (2006.01)
*H04B 7/185* (2006.01)
H04B 1/16 (2006.01)
H04B 1/525 (2015.01)
H04B 5/00 (2006.01)
H04L 27/38 (2006.01)
H04L 27/26 (2006.01)

(52) U.S. Cl.
CPC ............... *H04B 7/212* (2013.01); *H04B 1/16* (2013.01); *H04B 1/525* (2013.01); *H04B 5/0031* (2013.01); *H04B 5/0062* (2013.01); *H04L 27/2601* (2013.01); *H04L 27/3872* (2013.01); *Y02B 60/50* (2013.01)

(56) References Cited

U.S. PATENT DOCUMENTS

| | | | |
|---|---|---|---|
| 2009/0154590 A1* | 6/2009 | Suzuki | H04L 27/3872 375/286 |
| 2011/0028086 A1 | 2/2011 | Avellan et al. | |
| 2012/0044053 A1* | 2/2012 | Jung | G06K 7/0008 340/10.1 |
| 2013/0077563 A1 | 3/2013 | Pansoo et al. | |

* cited by examiner

MULTI-CHANNEL SPREAD SPECTRUM RETURN CHANNEL FOR ULTRA SMALL APERTURE TERMINALS (USATS)

RELATED APPLICATIONS

The present application claims priority to U.S. Provisional Application No. 62/322,009 filed Apr. 13, 2016 and India Application No. 201611035045 filed Oct. 13, 2016. The entire disclosures of those applications are hereby incorporated by reference.

BACKGROUND OF THE INVENTION

Field of the Invention

The present invention relates to communication over Ultra Small Aperture Terminals (USATs). More particularly, the present invention relates to the use of spread spectrum over USATs.

Background of the Related Art

Spread-spectrum communication is the generation of a signal spread in the frequency domain to provide a wider bandwidth at a lower power spectral density (PSD). In telecommunications, Ultra Small Aperture Terminals (USATs) or Antennas (such as 45-60 cm diameter in Ku band) are limited in the PSD that can be transmitted without incurring regulatory restrictions due to Adjacent Satellite Interference (ASI). Thus, spread-spectrum communication allows an ultra-small aperture terminal transmit to a satellite while meeting regulatory requirements on ASI. U.S. Pat. Nos. 8,285,203 and 7,907,894 describe a general conceptual framework for multi-channel spread-spectrum.

Many return channel TDMA systems (e.g., conforming to EN 301 545-2 Digital Video Broadcasting (DVB), Second Generation DVB Interactive Satellite System (DVB-RCS2) v1.2.1 (2014-04), as well as other proprietary systems such as Gilat, iDirect and Viasat) use unmodulated preamble (i.e., pure carrier for a fixed period). Phase estimation errors are greatly reduced even in negative signal-to-noise ratio regimes by filtering the received signal to the narrow occupied bandwidth during the preamble interval. See C. G. Hiremath and S. Jayasimha, "*Design of burst mode decision-feedback QPSK demodulator,*" Proceedings of SPCOM-1999, pp. 133-139. Technologies are emerging that use preamble-less TDMA systems, where distributed pilots (known symbols) are placed at regular intervals to aid carrier synchronization as in DVB-S2. See iDirect Technical Reference Guide—iDX Release 3.2; EN 302 307 *Digital Video Broadcasting* (DVB) Second Generation, v1.1.2 (2006-06); and EN 302 307-2 v1.1.1 (2014-10) DVB-S2 Extensions (DVB-S2X). The references noted in this section are hereby incorporated by reference in their entireties.

SUMMARY OF THE INVENTION

New standards, such as the VLSNR (Very Low Signal-to-Noise Ratio) modes in ETSI DVB-S2x (see EN 302 307-2 v1.1.1 (2014-10) DVB-S2 Extensions (DVB-S2X)), allow operation with $E_s/N_0$ as low as $-10$ dB, and modems complying with these standards are becoming available. However, to address legacy COTS modems, as well as to operate at $E_s/N_0$ lower than $-10$ dB, a modem or TDMA system agnostic spreader/de-spreader (external, but compatible with most systems) is desirable. While low-rate coding has superior performance compared to spreading, it comes at the price of latency. Accordingly, the spreader/de-spreader of the present invention is not only return-channel TDMA-system agnostic, but has low-latency so as not to effect TDMA timing at the hub (Table 2 below compares return channel performance with coded as well as spread-spectrum systems). The present method also caters for phase estimation for TDMA bursts with preamble absent.

The present invention provides return channel (i.e., from the USAT to Hub) burst-mode TDMA (Time Division Multiple Access) communications. The power spectral density at the transponder is reduced by spectral replication (e.g., by factor of 4), as shown in FIG. 1. It is assumed that any frequency offset/Doppler apply to the entire bandwidth of the composite received signal and the only action that needs to be performed, prior to de-spreading, is to acquire the phase offsets between replicated signals at the receiver. Novel contributions are: (1) ability to apply spread spectrum with commercially-off-the-shelf (COTS) burst mode TDMA modems; and (2) acquisition of channel phase offsets (without performing frequency acquisition, which remains an existing COTS demodulator (rather than de-spreader) function, based on the de-spread preamble/data.

Accordingly, it is one object of the invention to transmit low power over a USAT. It is another object to transmit low power over USATs using spread spectrum communications and minimizing latency delays. These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1:
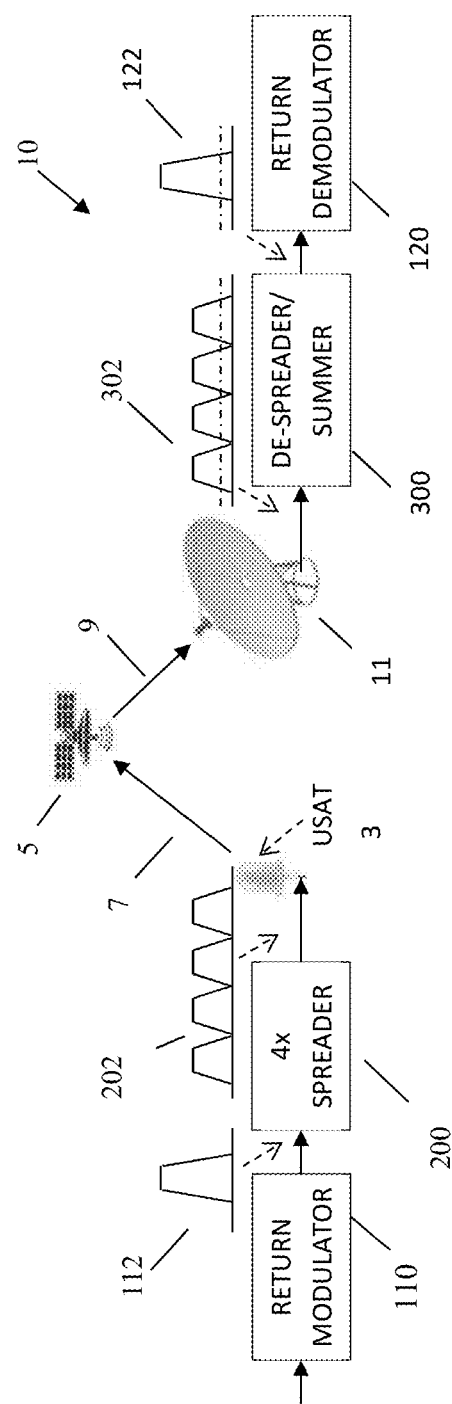
FIG. 1 is a block diagram showing a return link communication system with spreader and de-spreader units.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

FIG. 1 shows a communication system 10 in accordance with one illustrative non-limiting embodiment of the invention. The system 10 communicates signals over a USAT, such as an ultra-small aperture terminal 3. The system 10 includes a spreader 200 and de-spreader/summer 300. The data or information to be transmitted over the satellite 5 is received by a return modulator 110. The modulator 110 outputs a modulated signal 112. However, the modulated signal has a power level that could exceed the ASI PSD limit if transmitted over the satellite 5. Accordingly, a spreader 200 is provided that receives the modulated signal 112 and outputs a spread spectrum signal 202. The spread spectrum signal 202 has a lower PSD to avoid ASI when transmitted over the satellite 5, but contains all the information from the modulated input signal 112. The present invention enhances communication over the return channel (i.e., from the USAT 3 to the Hub 11) using burst-mode TDMA (Time Division Multiple Access).

The spread spectrum signal 202 is sent to the satellite 5 via the USAT 3 over an uplink channel 7, and transmitted to a receiver at the hub over a downlink channel 9. The received spread spectrum signal 302 is received by the de-spreader 300. The received signal 302 may include transponder noise, signals from adjacent transponders, and receive antenna noise. The de-spreader 300 sums the received spread spectrum signal 302 to provide an output summed signal 122, which restores the original modulated signal's spectral containment and its power spectral density (with non-coherent superposition of transponder and antenna noise PSD) 112. The summed signal 122 is then further processed, such as being demodulated by the return demodulator 120.

In the embodiment of FIG. 1, the return link signal is BPSK ½ modulation and code, a bitrate/symbol rate of 256 kbps/512 ksps, an occupied bandwidth of 615 kHz (at 20% roll-off), and a burst format of preamble (128 symbols), user data (>128 symbols), and guard time (64 symbols). The spreader 200 has a spreading factor of 4, a spreading type of spectral replication, an input signal bandwidth of 615 kHz, and an output signal bandwidth of 2.46 MHz. The de-spreader 300 matches the spreader 200, and therefore has a de-spreading factor of 0.25, a de-spreading type of coherent combining, an input signal bandwidth of 2.46 MHz, and an output signal bandwidth of 615 kHz. The modulator 110 and demodulator 120 can be, for instance, existing components, and the demodulator 120 can be a hub-based TDMA burst return channel demodulator. The system 5 has a 6 dB reduction in ASI due to spreading, and approximately 5.5 dB de-spreader combining gain. Spreading by 4 and rate ½ BPSK is a practical system that is used for illustrative purposes. Both larger and smaller spreading factors are possible, for example, more or less than a factor of 4 spreading can be utilized. And MODCODs other than BPSK rate ½ can be utilized.

The modulator 110 does not "know" that it is followed by the spreader 200, and the demodulator 120 does not "know" that it is preceded by the de-spreader 300 in the signal processing chain. Thus, for a large enough antenna aperture (e.g., 1.2 meters), the spreader 200 and de-spreader 300 can be entirely omitted, without changing the operation of the system 5 or the modulator 110 and demodulator 120.

Figure 2:
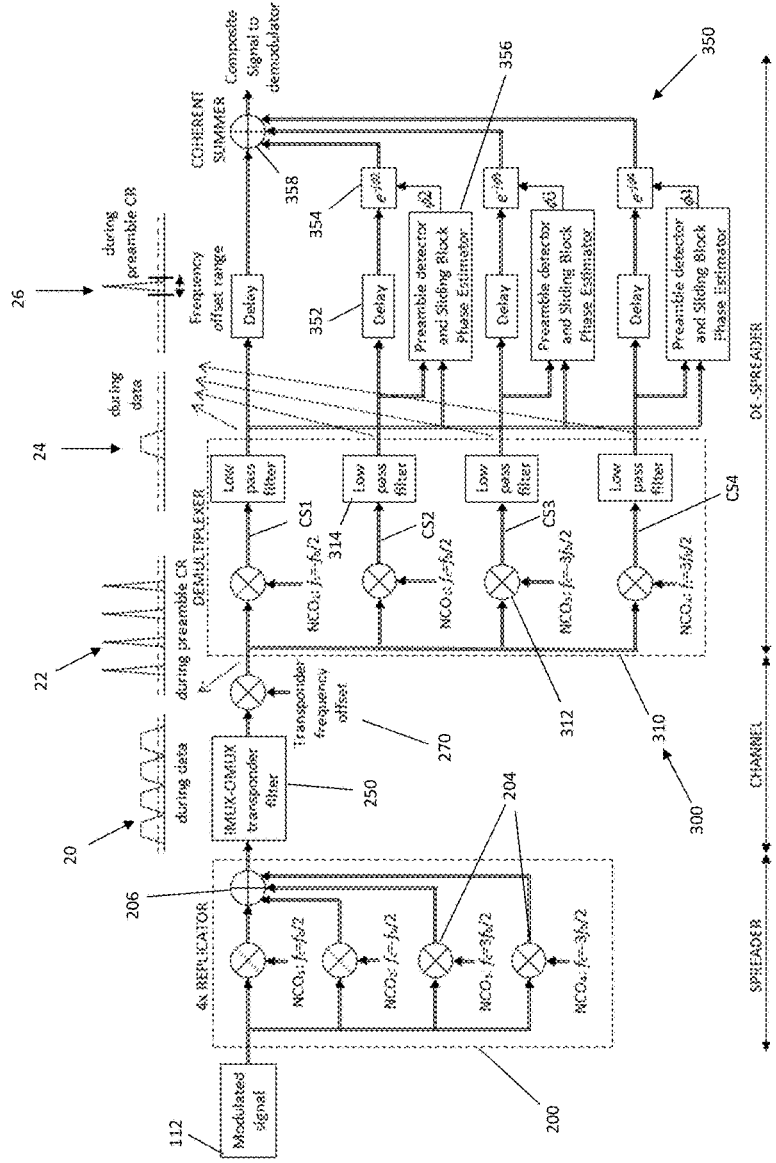
FIG. 2 is a detailed block diagram highlighting the spreader, channel and de-spreader sections of FIG. 1.

Turning to FIG. 2, a spreader 200 and de-spreader 300 are shown in accordance with a non-limiting embodiment of the invention. The spreader 200 has an input that receives, for example, the output modulated signal 112 from the return-channel modulator 110. It receives the modulator signal 112 of bandwidth $f_b$, at center frequency $f_c$. The modulator signal 112 is then spectrally replicated 4 times at frequencies $f_c+f_b/2$, $f_c-f_b/2$, $f_c+3\cdot f_b/2$, $f_c-3\cdot f_b/2$. The spreader 200 has tuners 204 of the split signal from the modulator 112 and a combiner or summer 206. The number of tuners 204 (four in the example of FIG. 2) determines the number of replications for the spread spectrum signal 202. Each of the tuners 204 receives the modulated signal 112 and spectrally replicates the signal, to provide four replicated signals.

The replicated signal from each of the four tuner 204 outputs is received at the input of the summer 206. The summer 206 combines (sums) each of those replicated signals to provide a single spreader output signal, here spread spectrum signal 202. The total occupied bandwidth of the output spread spectrum signal 202 is thus $4 \cdot f_b$. The generated composite signal is scaled down by 6 dB to maintain the same average power as the input to the uplink 7 to the satellite 5. The phases of the 4 carriers could be set, for example, to 0, $0.2277\pi$, $0.3867\pi$ and $1.05\pi$ radians so as to minimize the peak-to-average power (PAPR) in the composite signal 202.

The satellite transponder 5 includes a filter 250 and frequency offset 270. The transponder IMUX/OMUX filters are represented by a combined filter 250. The Input Multiplexer (IMUX) divides the incoming USAT signal to separate individual transponder channels. To overcome interference between channels, demanding filter performance requirements have to be met by the Input Multiplexers. The transponder then translates the channels to the downlink frequencies and there is a small frequency offset introduced due to the stability of the on-board oscillator on the satellite. This offset is simulated by the mixer 270. The function of an output multiplexer (OMUX) is to combine the signals from the transponder power amplifiers to feed the antenna network. Although the OMUX filter has as its input the frequency offset signal, the frequency offset introduced is small enough so that the combined IMUX/OMUX frequency response is taken for 250 and the frequency offset 250 is shown at the output of the IMUX/OMUX filter 250.

As shown and described with respect to FIGS. 1 and 2, the de-spreader 300 is followed by the return demodulator 120 at the hub. Referring to FIG. 2, the de-spreader 300 includes a de-multiplexer 310 and an offset compensation circuit 350. The de-multiplexer 310 has multiple tuners 312 and low pass filters 314. Each tuner 312 is associated with and connected to a respective low pass filter 314. The tuners 312 overlay the four spectrally replicated carrier signals $CS_1$, $CS_2$, $CS_3$, $CS_4$ from the received signal 302 to a common band (in order to combine them). Each carrier signal $CS_1$, $CS_2$, $CS_3$, $CS_4$ passes from the carrier 312 to the respective low pass filter 314 in order to reject out-of-band noise and images.

Figure 7:
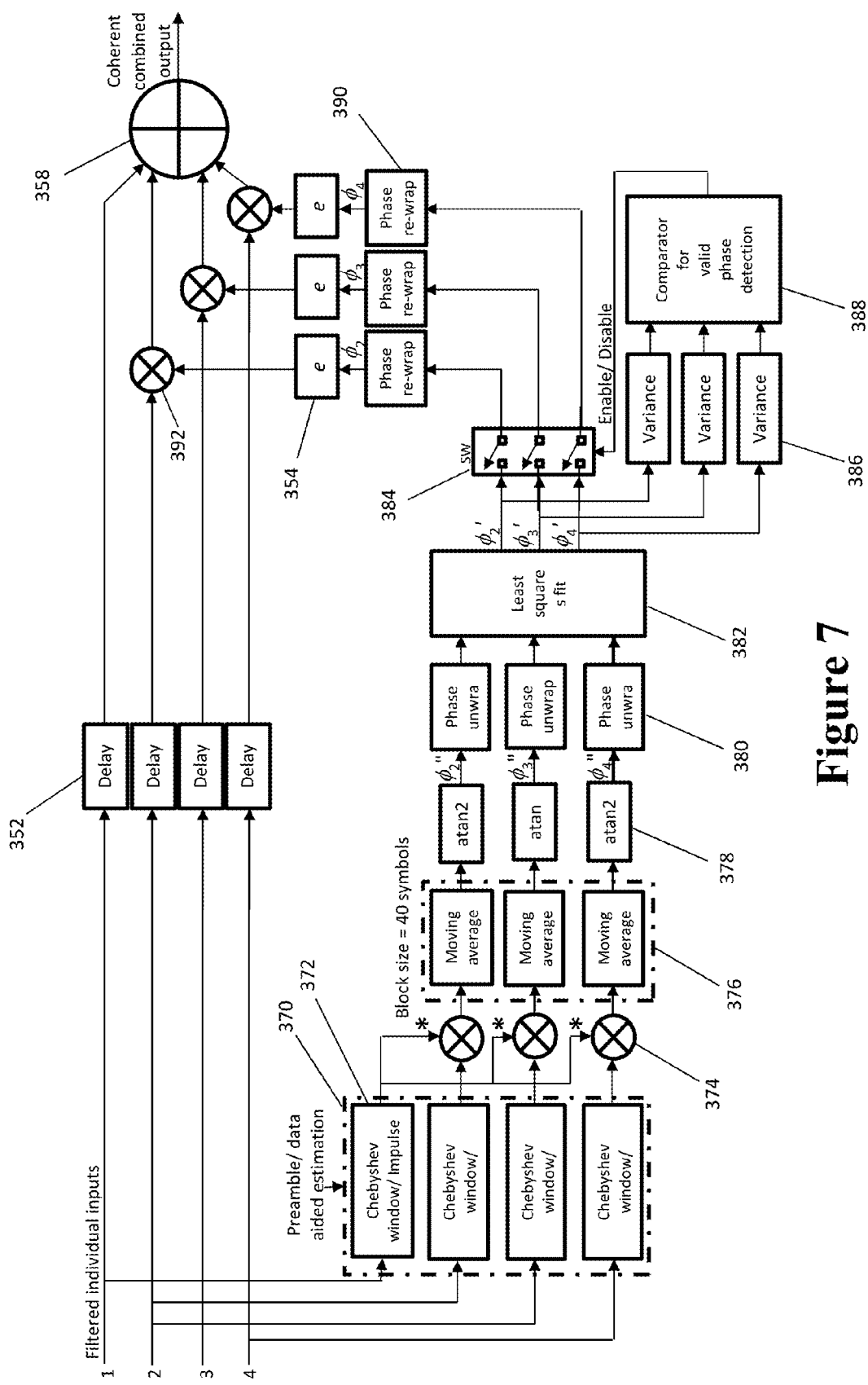
FIG. 7 is a block diagram of the phase estimator and coherent combiner.

Referring to FIGS. 2 and 7, the offset compensation circuit 350 has multiple delay modules 352, phase rotator modules 354, preamble detectors with sliding block phase estimators 356, and a coherent summer 358. Each of the delay modules 352 receives a retuned and filtered carrier signal $CS_1$, $CS_2$, $CS_3$, $CS_4$ from a respective tuner 312 and low pass filter 314 of the de-multiplexer 310. The four delay modules 352 delays the corresponding filtered $CS_1$, $CS_2$, $CS_3$, $CS_4$ signals by a fixed delay to time align with the phase offset estimates of $CS_2$, $CS_3$, $CS_4$ signals with respect to reference signal $CS_1$. Since phase rotations of $CS_2$, $CS_3$, $CS_4$ are applied a little later due to finite time taken for their phase offset estimation, $CS_1$ should also be delayed to maintain the alignment and then added to $CS_2$, $CS_3$, $CS_4$. The delays compensate for the time taken to compute phase output.

The alignment of signals $CS_1$, $CS_2$, $CS_3$, $CS_4$ is maintained during combining 358. The delay that is applied to carrier signals $CS_2$-$CS_4$ are also applied to $CS_1$ (i.e., the delay is equal for all the carrier signals $CS_1$, $CS_2$, $CS_3$, $CS_4$). The delay modules 352 delays the signal by a period of time corresponding to the time taken to estimate the phases of channels $CS_2$-$CS_4$ (e.g., by the filter 372, cross correlation 374, sliding window averaging 376, phase computation 378, least squares fit 382—i.e., the latency with feeding the input and obtaining the phase output) which may be a hundred samples or more corresponding to few hundred microseconds. This amount of time does not appreciably alter TDMA timing which must cater for up to 300 ms of satellite round trip delay.

The first delay module 352 outputs the delayed signal directly to the coherent summer 358. However, the second, third and fourth delay modules 352 operate in conjunction with a respective preamble detector and sliding block phase estimator 356, and phase adjustor or phase rotator 354. As a result of the transmission via the satellite 5, the phase of the four carrier signals $CS_1$, $CS_2$, $CS_3$, $CS_4$ become offset from one another. Accordingly, the estimator 356 determines the amount of phase offset and adjusts the carrier signals so that they are all in phase alignment with each other and can then be summed by the summer 358. The system only needs to determine the amount of phase offset for the second, third and fourth carrier signals $CS_2$, $CS_3$, $CS_4$ with respect to the first carrier signal $CS_1$, so an estimator 356 and rotator 358 need not be provided for combining them with the first carrier signal $CS_1$. That is, a phase estimator 356 and rotator 358 are not provided for the first carrier signal $CS_1$. Accordingly, the first carrier signal $CS_1$ operates as a reference for the second, third and fourth carrier signals $CS_2$, $CS_3$, $CS_4$. The delay modules 352 allow the four carrier signals $CS_1$, $CS_2$, $CS_3$, $CS_4$ to remain synchronized and account for the time for the estimator 356 and rotator 354 to perform their operations. All phase estimation lags are equal and are compensated for by inserting equivalent lags 352 in the direct signal paths that account for the phase estimation delay.

It is further noted that the four carrier signals $CS_1$, $CS_2$, $CS_3$, $CS_4$ realize an equal or constant frequency offset when transmitted over the satellite links 7, 9, so the de-spreader 300 need not adjust the carrier signals $CS_1$, $CS_2$, $CS_3$, $CS_4$ to compensate for frequency or otherwise perform frequency offset acquisition, leaving it for the demodulator 120 to figure it out (as it did without the spreader/de-spreader). The de-spreader 300 does not modify the signal for frequency offset so that it can remain transparent to the demodulator 120 from a frequency standpoint.

Each estimator 356 has a first input that is connected to the first low pass filter 314, and a second input that is connected to a respective one of the second, third and fourth low pass filters 314. The estimator 356 receives the first carrier signal $CS_1$ from the first low pass filter, and receives the second, third, and fourth carrier signal $CS_2$, $CS_3$, $CS_4$ from the respective second, third or fourth low pass filter 314. Thus, the first estimator 356 receives the first carrier signal $CS_1$ from the first low pass filter 314, and receives the second carrier signal $CS_2$ from the second low pass filter 314; the second estimator 356 receives the first carrier signal $CS_1$ from the first low pass filter 314, and receives the third carrier signal $CS_3$ from the third low pass filter 314; and the third estimator 356 receives the first carrier signal $CS_1$ from the first low pass filter 314, and receives the fourth carrier signal $CS_4$ from the fourth low pass filter 314.

Each phase rotator 354 receives the delayed output from the respective second, third and fourth delay modules 352, and also receives the estimated phase output from the respective first, second and third estimators 356 that are associated with the phases of second, third and fourth carrier signals $CS_2$, $CS_3$ and $CS_4$ respectively with respect to $CS_1$. Each block phase estimator 356 computes the phase offset between the channel and the reference channel by cross-correlation. The phase rotator 354 rotates the signal by a phase phi and outputs the phase-adjusted carrier signal to the coherent summer 358. Accordingly, the coherent summer 358 receives the delayed output from the first delay module 352, and the first, second, and third phase-rotated carrier signals from each of the first, second and third phase rotators 354. The summer 358 combines (by adding) those signals to form a composite signal 122 (FIG. 1).

Thus in operation, the de-spreader 300 receives the composite signal 302 on the downlink 9, after down-conversion either at L-band or a suitable intermediate frequency (IF), from the satellite 5. Frequency offset associated with Doppler of the satellite 5 is equal in all the four carriers $CS_1$, $CS_2$, $CS_3$, $CS_4$ of the composite signal 302, eliminating the need for frequency offset acquisition. The signal 302 containing spectrally replicated carriers are retuned to occupy the same frequency band preparatory to combining. As shown in FIG. 2, each of the separated signals $CS_1$, $CS_2$, $CS_3$, $CS_4$ are filtered by the respective low pass filter 314.

The first, second, and third estimators 356 receive the carrier signals and estimates the relative phases $\phi_2$, $\phi_3$ and $\phi_4$ of the second, third and fourth carrier signals $CS_2$, $CS_3$, $CS_4$ with reference to the first carrier signal $CS_1$ by cross-correlation of the carrier with the reference $CS_1$. The accuracy of the estimate is limited by the length of the analysis window (the longer the length, the more accurate the estimate) and by signal-to-noise ratio, SNR (the lower the SNR, the lower the accuracy). Each of the first, second and third phase rotators 354 adjusts the phases of the second, third and fourth carrier signals $CS_2$, $CS_3$, $CS_4$, respectively, so that the phases of the second, third and fourth carrier signals $CS_2$, $CS_3$, $CS_4$ align with the phase of the first carrier signal $CS_1$. Thus, all of the carrier signals $CS_1$, $CS_2$, $CS_3$, $CS_4$ are aligned to have near equal phase. The more phase-aligned the carriers, the better the de-spreader's coherent gain (which for 4 carriers is 6.02 dB). Practically, a phase estimation error of up to 10° hardly introduces any loss to the de-spreader's coherent gain, so that they can then be combined by the summer 358 to obtain a coherent gain of greater than 5.5 dB (the gain is limited by 6 dB for replication by 4). The output of the de-spreader 300 is then passed to the return demodulator 120.

The spectra of the signals 20 shows the output of the spreader 200 with random data at the input of the modulator 110 (in FIG. 1). The signal 22 shows the output of the spreader 200 during preamble. The signal 24 shows the output of the de-multiplexer 310 with random data at the input of the modulator 110 (in FIG. 1), and the signal 26 shows the output of the de-multiplexer 310 during preamble. The de-spreader output is the same as signals 24, 26, but with a higher PSD due to combining gain.

The detailed operation of the estimator 356 will now be discussed, with reference to FIGS. 2, 7. Each carrier signal $CS_1$, $CS_2$, $CS_3$ and $CS_4$ is first passed through a filter 372. Based on the user input as to whether the estimation has to be aided by preamble or data, the coefficients of the filter 372 are initialized to Chebyshev window or impulse window respectively. Chebyshev window has a narrow frequency response and hence it is used to filter the preamble (for estimation based on preamble), whereas impulse window has flat frequency response for all frequencies and hence the filter's output is same as input (for estimation based on data).

Preamble Aided De-Spreading

Figure 3:
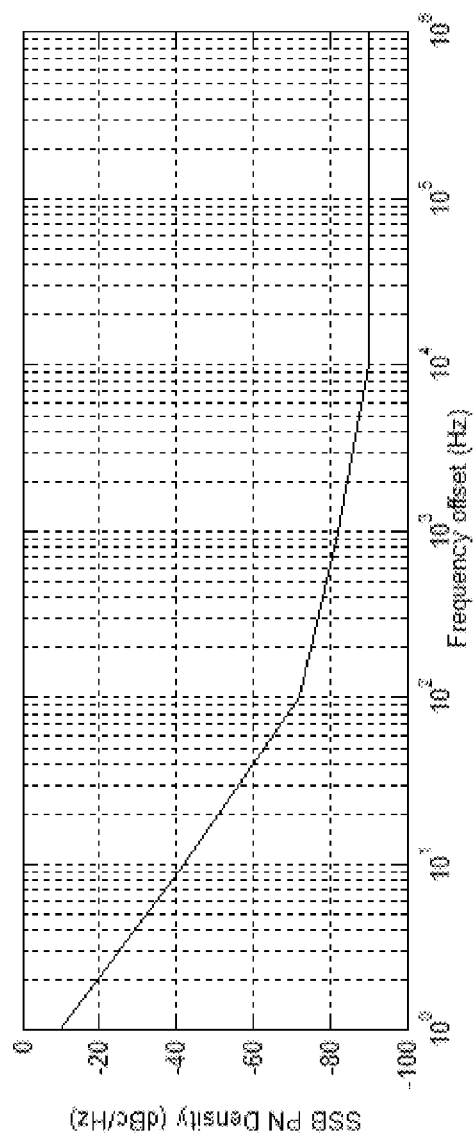
FIGS. 3, 4 are charts showing phase noise mask.
Figure 4:
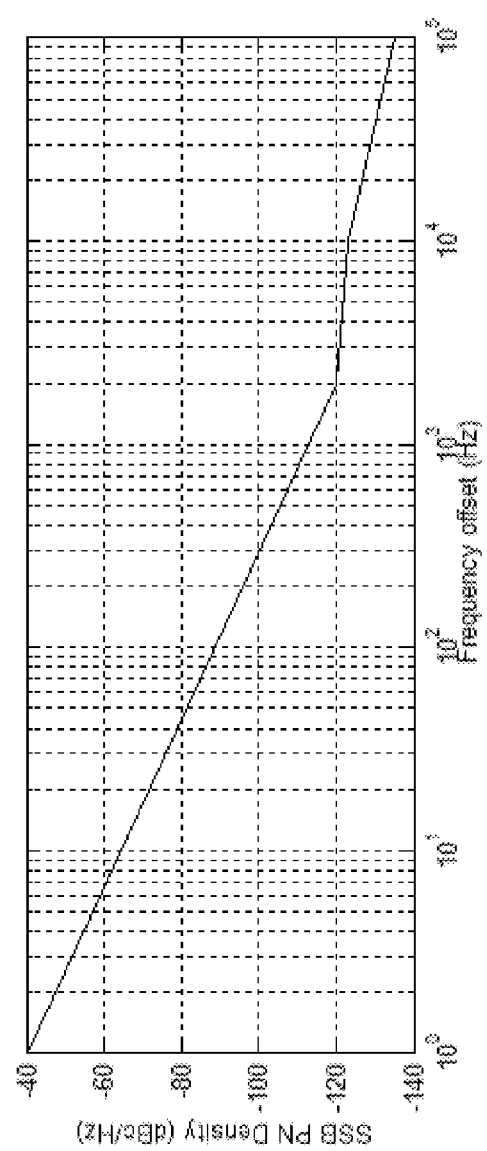

The Digital Video Broadcasting, EN 301 545-2 references specifies the use of the preamble in bursts to aid receiver synchronization. Some of the lower modulation and coding burst formats from Annexure A-1 of that reference are illustrated in Table 1 below. The data in the last column indicates that 6.3203 ms is the longest burst duration for a 512 ksps symbol rate waveform. Since phase noise corresponding to the inverse of this duration is better than −75 dBc/Hz (from FIG. 3), it is assumed that the phase estimated from preamble would be valid for the entire burst.

Referring to the first entry in Table 1, for example, the first column is merely an index. The second column indicates that the burst length is 664 symbols of which 456 (column 3) carry data—the remaining are overheads such as preamble. The fourth column indicates that the modulation is QPSK and coding rate is ⅓. The fifth column indicates the preamble duration, while the last column indicates the total TDMA burst duration. The table shows the range of burst durations and the durations of the preamble which the spreader 200 and de-spreader 300 must account for.

TABLE 1

DVB-RCS2 Reference Waveforms

| Waveform ID | Burst Length (symbols) | Payload length (bytes; symbols) | MODCOD | Preamble length (symbols) | Burst duration assuming 512 ksps symbol rate (ms) |
| --- | --- | --- | --- | --- | --- |
| 1 | 664 | 38; 456 | QPSK-1/3 | 155 | 1.2968 |
| 2 | 262 | 14; 168 | QPSK-1/3 | 41 | 0.5117 |
| 3 | 536 | 38; 456 | QPSK-1/3 | 27 | 1.0468 |
| 4 | 536 | 59; 472 | QPSK-1/2 | 22 | 1.0468 |
| 13 | 1616 | 123; 1476 | QPSK-1/3 | 32 | 3.1563 |
| 14 | 1616 | 188; 1504 | QPSK-1/2 | 25 | 3.1563 |
| 32 | 832 | 100; 800 | QPSK-1/2 | 32 | 1.625 |
| 34 | 1392 | 170; 1360 | QPSK-1/2 | 32 | 2.7187 |
| 40 | 1868 | 59; 1416 | BPSK-1/3 | 313 | 3.6484 |
| 41 | 1612 | 59; 1416 | BPSK-1/3 | 57 | 3.1484 |
| 42 | 3236 | 123; 2952 | BPSK-1/3 | 65 | 6.3203 |
| 43 | 3236 | 188; 3008 | BPSK-1/2 | 52 | 6.3203 |

The TDMA burst signal 302 at the input of the de-spreader 300 has an $E_s/N_0$ of about −4 dB. A Chebyshev window is used to select the pure carrier (present during the preamble duration of burst) used to recover differential carrier phase (relative to any one channel called the reference channel). This is accomplished using a cross-correlation based N-symbol sliding window block phase estimation. The variance of all the phases falling below a threshold provides a means of determining whether the preamble is present. As shown in the state machine of FIG. 5, once the preamble is detected, the phases $\phi_2$, $\phi_3$ and $\phi_4$ of the current burst are set to accomplish coherent combining of all the four individual carrier signals $CS_1$, $CS_2$, $CS_3$, $CS_4$. The delay elements 352 (FIG. 2) synchronize data with processing delays and ensure that the TDMA burst is fully presented to the demodulator. Preamble-based de-spreading delays are substantially smaller than those for data-aided de-spreading because signal 22 has a higher signal-to-noise density ratio than signal 20 in FIG. 2.

Figure 5:
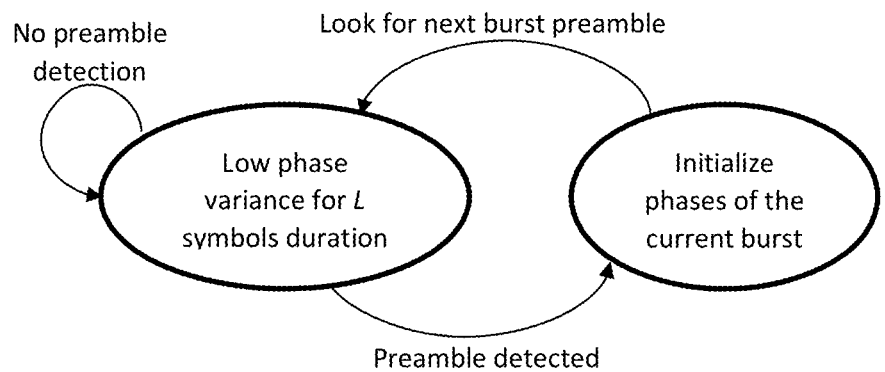
FIG. 5 is a state machine diagram of the preamble aided de-spreader.

FIG. 5 shows a state machine for preamble-based de-spreading. It looks for phase variance to be less than a threshold (say 10°) for some selectable L symbol duration. If preamble is detected within this duration, there is a state transition (otherwise, we stay in the same state) to indicate start of a burst signal and apply the estimated phases to the current burst. When the phase variance exceeds the threshold, the estimated phase is frozen and we transition back to the first state—look for phase stability awaiting preamble detection of next burst.

Data Aided De-Spreading

The de-spreader 300 can operate on carrier signals CS that have preambles, as discussed above, but can also operate on carrier signals CS that do not have preambles. If a carrier signal CS does not have a preamble, the de-spreading operation can be conducted based on the data contained in the carrier signal CS. For example, some modems use proprietary waveforms with distributed pilots rather than using the entire preamble at the beginning of the waveform, to provide better synchronization and tolerances to channel conditions. Some hubs prioritize or maximize the return link traffic for a certain VSAT by dynamically allocating longer time slots for the burst transmission, which might exceed the waveform durations shown in Table 1 above. In such cases, a one-time phase detection based on preamble described in the section above, falls short on performance as phase could drift over the burst duration and requires tracking or continuous estimation.

Thus, the system does not rely on a preamble always being present or a known maximum burst duration. Phase need not be estimated continuously because the phase noise is small at the reciprocal of the burst duration. However, if the burst duration is long, then the phase noise can become significant necessitating phase to be estimated continuously (rather than the beginning of the burst).

Figure 6:
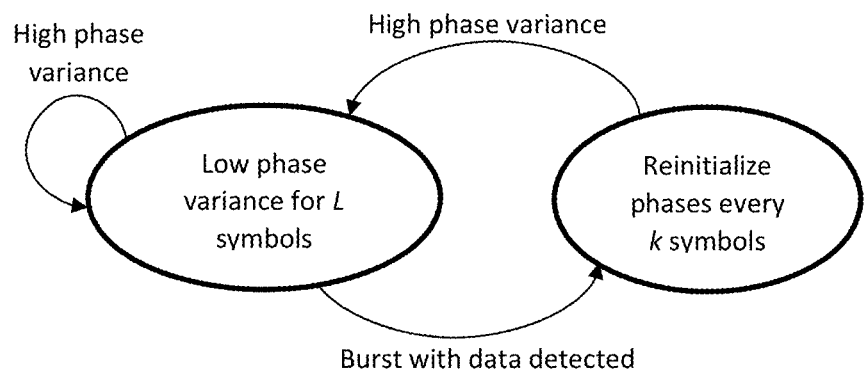
FIG. 6 is a state machine diagram of the data aided de-spreader.

As shown in the data aided state machine of FIG. 6, the phases $\phi_2$, $\phi_3$ and $\phi_4$ of the current burst are initialized when all the 3 phase variances goes below a threshold and then those phases are periodically updated as long as the variances remains below a threshold to adapt to the varying phase due to the channel or clock offsets. The block size is larger than that of preamble based estimation because the signal-to-noise spectral density is lower. In FIG. 6, we look for low phase variance for L symbols (just as in FIG. 5) and transition to the TDMA reception mode if a burst is detected. Since we do not know the length of the burst or any marker for end of burst, we transition out of that state (looking for the next burst) only when any of the phase variances is high.

To further reduce phase variance, without using a larger estimation block-size, we fit estimated phases so that the mean-square error form a straight line passing through the reference carrier frequency is minimum (and that error is below a threshold) is used as the phase-difference sequence. That the phases fit a straight line (i.e., linear) assumes that the transponder group delay distortion across the bandwidth considered is small. Assume each burst from the remote TDMA modulator has a maximum bandwidth of 615 kHz, which become 2.46 MHz after a factor of 4 spreading; this bandwidth is small enough (in a 36 or 72 MHz transponder) for group delay distortion to be neglected. For larger bandwidths, group delay distortion must be compensated prior to de-spreading.

A generalized block phase estimator that combines features for both preamble and data-aided de-spreader, using a least squares' linear fit for phases, is detailed in FIG. 7. The carrier signals $CS_1$, $CS_2$, $CS_3$, $CS_4$ are passed through filters that filter the preamble/data depending on the type of estimation. The carrier signals $CS_2$, $CS_3$ and $CS_4$ are then cross-correlated 374 with reference carrier $CS_1$. The cross-correlated signals are then passed through sliding window accumulators 376 whose output is used to compute the differential phase offsets using a tan 2 operation 378. The phases need to be unwrapped 380 (from their principal values from 0° to 360°) in such a way that a minimum variance from a straight line results. The straight-line fit phases from 382 must be re-wrapped 390 (back to their principal values from 0° to 360°) for phase rotation by phase rotation modules 392 of carriers signals $CS_2$, $CS_3$, $CS_4$ after the delay 352 and prior to coherent combining 358 of the 4 channels. The least-squares fit to linear-phase process reduces the phase variance for a given block size. Equivalently, given a desired phase variance, a smaller block-size and a reduced processing delay result. Variance at a variance module 386 of the estimated phases is compared by the comparator 388 against a threshold to enable/disable the phase updates by controlling the switch 384.

In one example embodiment of the invention, the return link signal has BPSK modulation, a symbol rate of 512 ksps, burst format of preamble (128 symbols), user data (>128 symbols), and 15 guard time (64 symbols). The channel frequency offset is 10 kHz, and phase shift of four carriers via various channel filters, and Es/N0 at input of de-spreader of −4 dB. FIGS. 8A, 8B, 8C, 9A and 9B provide spectral plots at various stages of simulation showing the spectral replication at spreader and coherent combining gain at de-spreader. The plots also show a comparison of estimated phases with expected phases, and the de-spreader coherent gain for each burst. The coherent gain is 5.5-5.95 20 for low Es/N0 (as against the maximum possible gain of 6 dB for combining 4 replicated signals). This demonstrates that the system of separating/cascading, spreading/de-spreading, from/of standard TDMA modems as a viable technique (with a worst-case combining loss of 0.5 dB for the chosen system parameters).

Figure 8A:
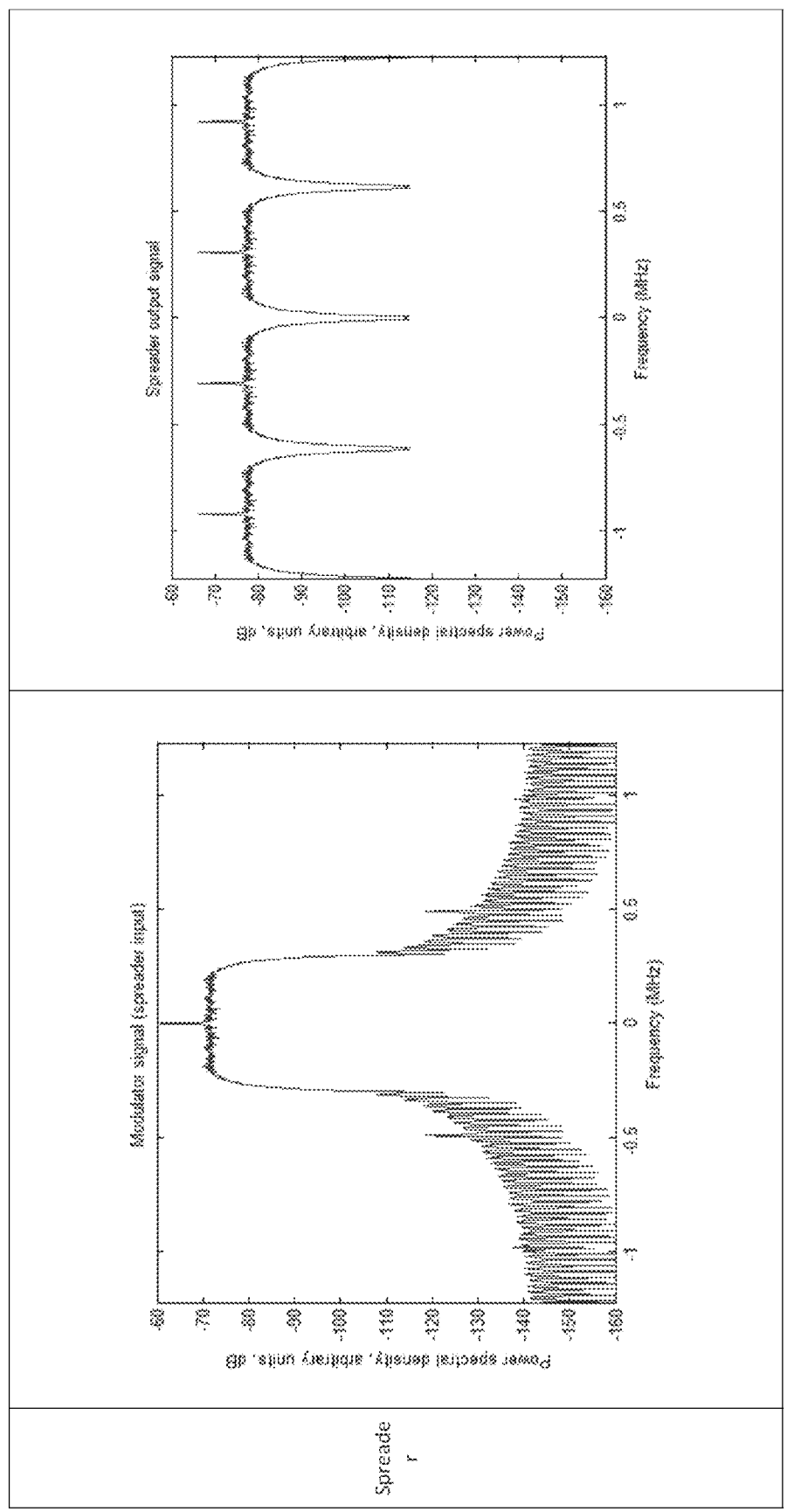
FIGS. 8A, 8B, and 8C are graphs showing burst spectra at input and output of spreader and de-spreader with preamble portion resulting in a "carrier leak" in the observed spectrum analyzer output (as the preamble gives rise to a pure tone for its duration)
Figure 8B:
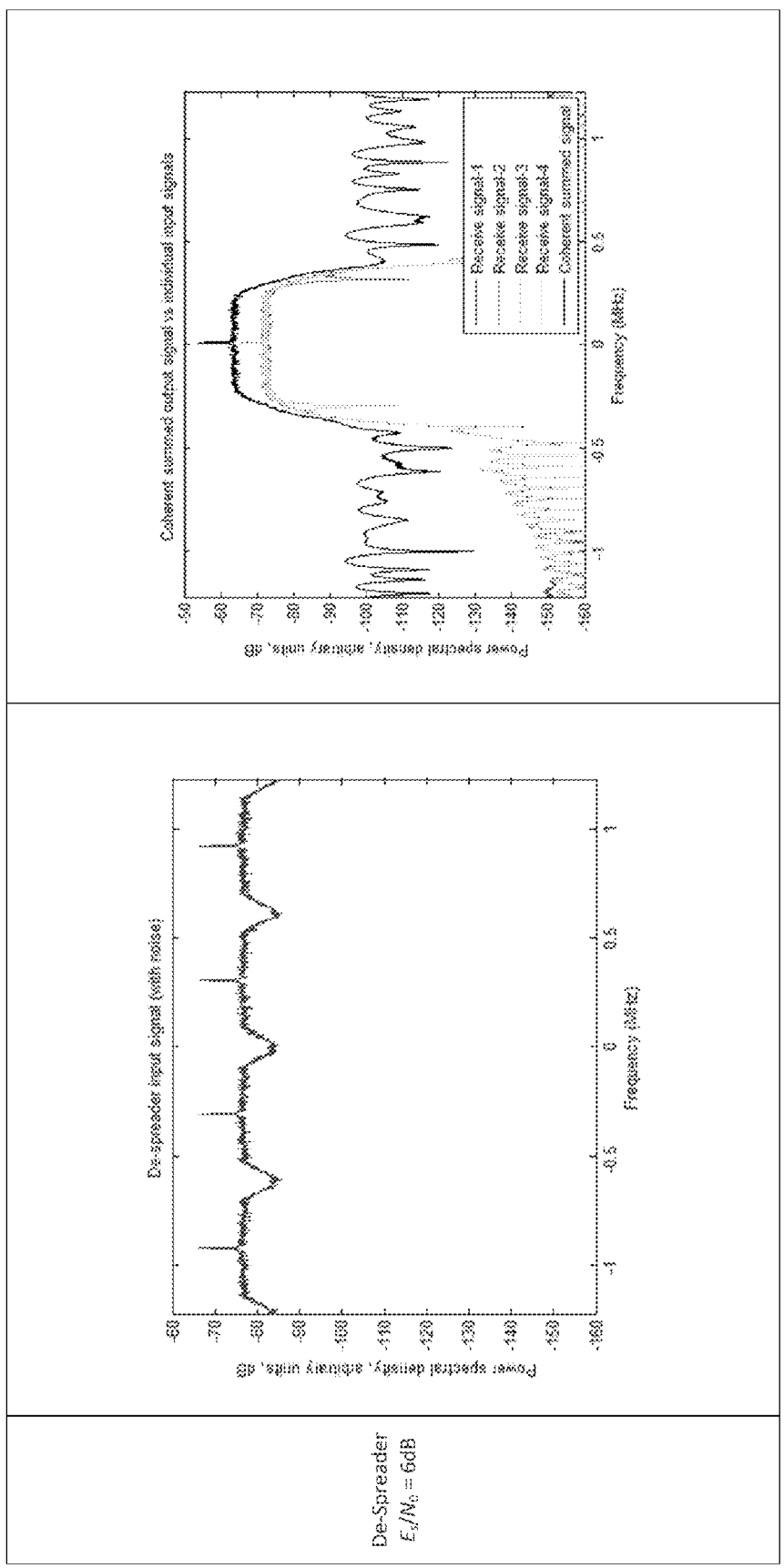
Figure 8C:
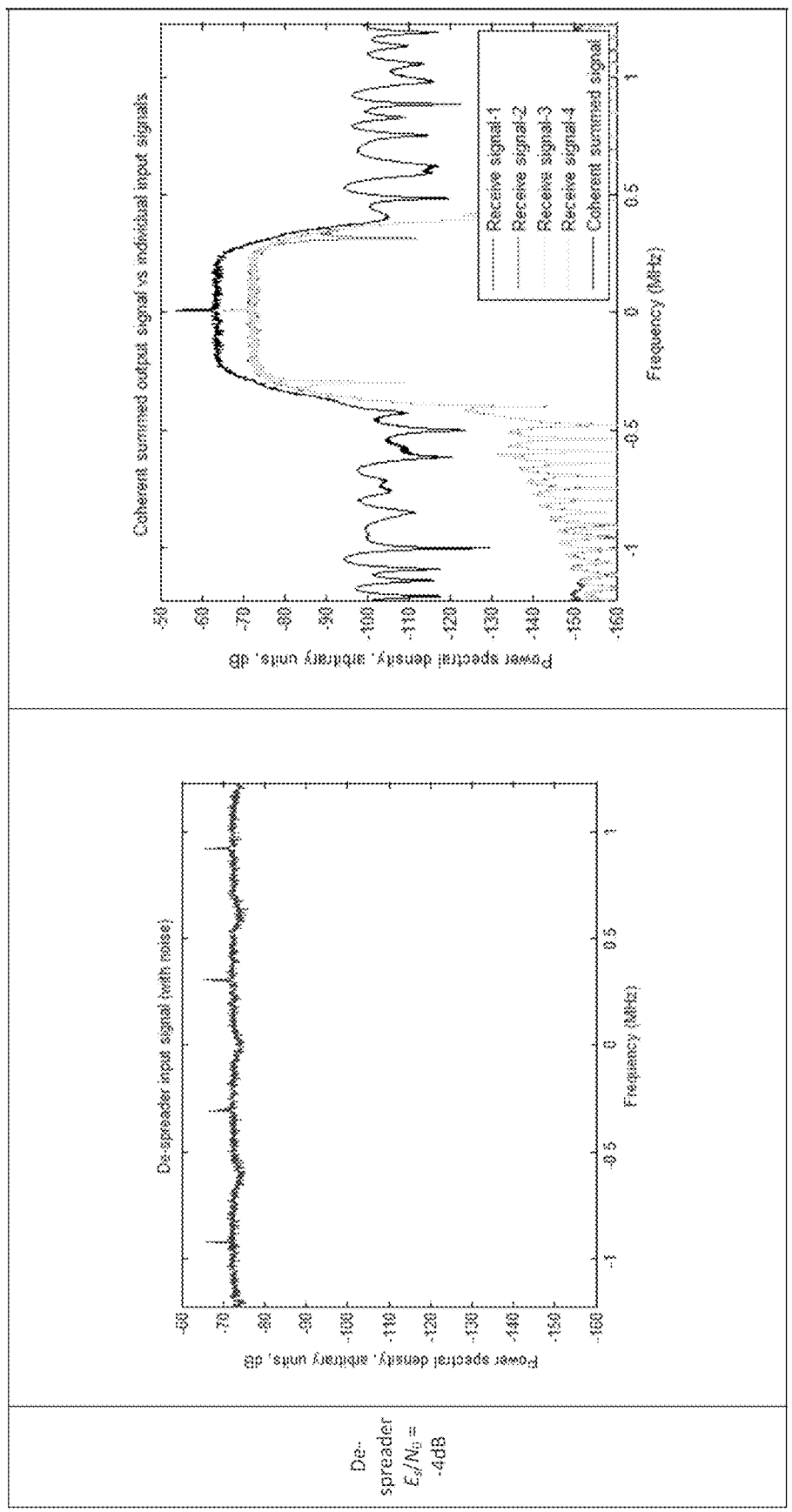
Figure 9A:
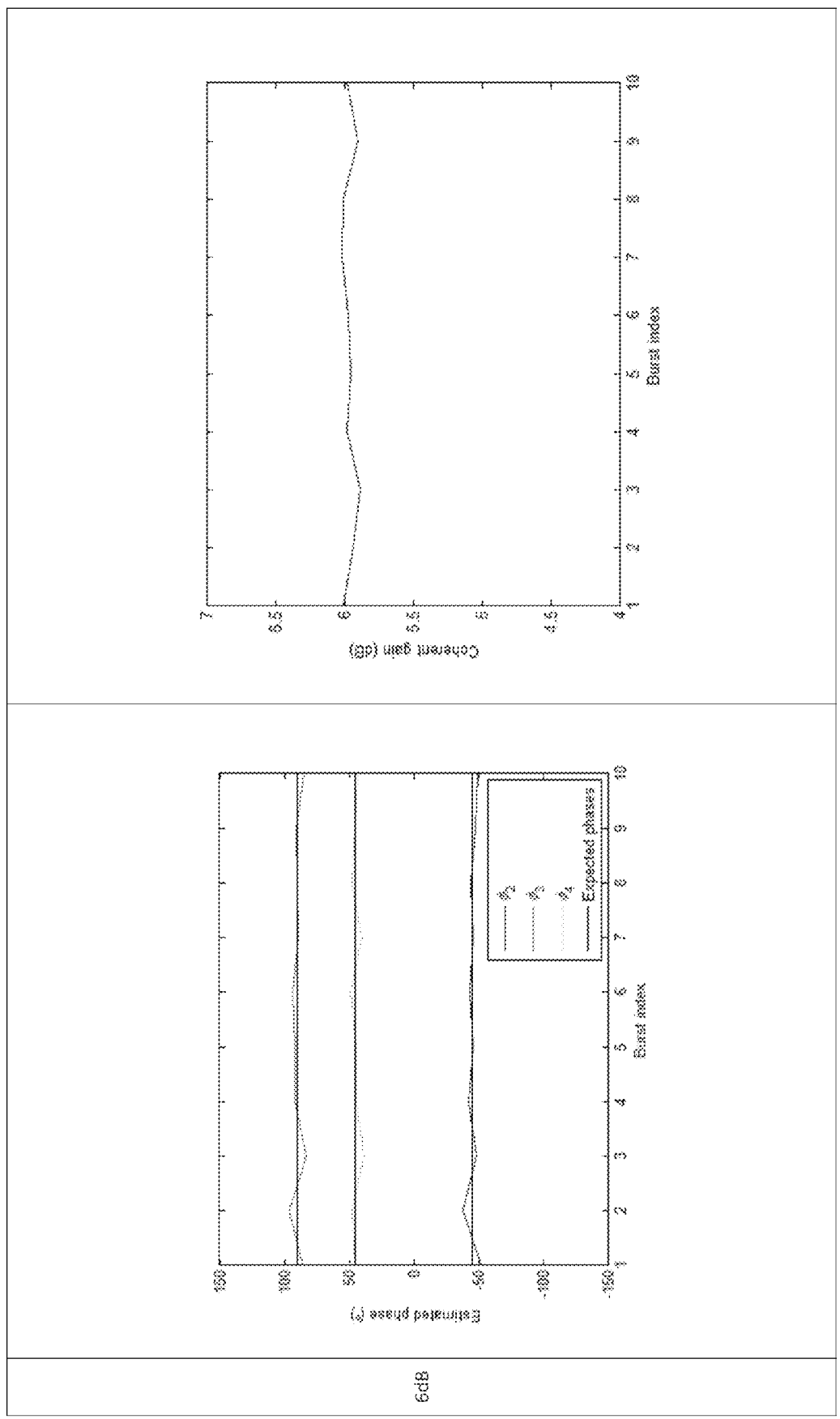
FIGS. 9A and 9B are graphs showing estimated phase and coherent gain obtained for each burst.
Figure 9B:
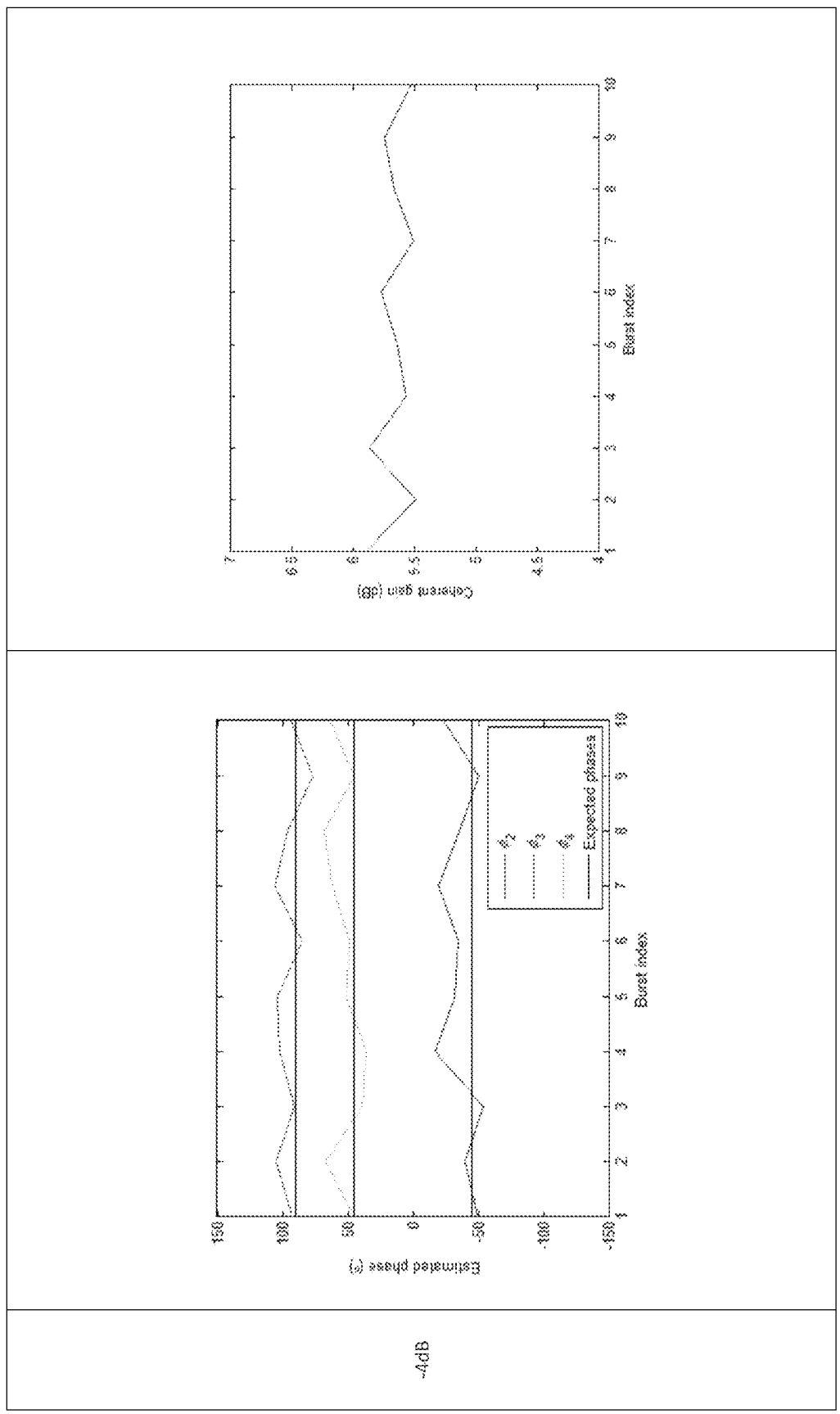

FIG. 8A shows the spectrum of spreader input and output for a burst with preamble. FIG. 8B shows the spectrum of the de-spreader input and output at a high Es/N0 of 6 dB, while FIG. 8C shows the de-spreader input and output at a poor Es/N0=−4 dB. FIG. 9A shows that the phase variance is small at Es/N0=6 dB (and the 5 coherent gain 6 dB) while FIG. 9B shows that the phase variance is large at Es/N0=−4 dB (and the coherent gain only an average of 5.7 dB) for the same estimation block size.

CONCLUSIONS

Table 2 shows the channel capacity thresholds, required thresholds, and thresholds actually achieved by the present invention.

Guidelines for Implementation and use of EN301 545-2). Of the 1.8 dB difference, 1 dB can be accounted by the coding gain (which will not be achieved by spreading alone), while 0.3 dB is an implementation loss in the hub demodulator and a further 0.5 dB loss is introduced by the spreader/de-spreader implementation. The combining gain with a factor of 4 spreader/de-spreader system is about 5.6 dB as compared to $E_s/N_0$ of each individual spreader carrier. In addition, the combined latency added by spreader and de-spreader equipment is negligible, measured to be about 370 μs for 512 ksps symbol rate tests, which corresponds to 190 symbols). No TDMA timing adjustment was needed. In contrast, the much greater latency expected with a coded system may require TDMA timing adjustment.

Within this specification, embodiments have been described in a way which enables a clear and concise specification to be written, but it is intended and will be appreciated that embodiments may be variously combined or separated without departing from spirit and scope of the invention. For example, it will be appreciated that all preferred features described herein are applicable to all aspects of the invention described herein.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A return channel system for ultra-small aperture terminals comprising:
   a spreader configured to receive an input signal and output a spread spectrum signal having multiple replicated signals with a lower power than the input signal; and
   a de-spreader comprising:
      a de-multiplexer configured to receive the spread spectrum signal via a satellite channel, said de-multiplexer separating the spread spectrum signal into a first channel having a first signal and a second channel having a second signal;
      an offset compensation circuit having a phase estimator configured to estimate a phase offset between a phase of the first signal and a phase of the second signal;

TABLE 2

Channel capacity thresholds, thresholds required by guidelines, and measured thresholds

| Case | bits/symbol | Channel Capacity threshold $E_b/N_0$ (dB) | Channel Capacity threshold $E_s/N_0$ (dB) | Threshold $E_s/N_0$ (dB) @PER = 1e-5 as per ETSI | Observed threshold $E_s/N_0$ (dB) of COTS hub | Observed threshold $E_s/N_0$ (dB) with spreader/de-spreader system in COTS hub |
|---|---|---|---|---|---|---|
| BPSK 1/2 | 1/2 | −0.8 | −3.8 | −1.3 | −1.0 | N.A. |
| BPSK 1/2 4× Spreading | 1/8 | −1.4 | −10.4 | −8.4 (inferred) | N.A. | −6.6 |

One advantage of the present invention is that the spreader/de-spreader system performance is only 1.8 dB away from the threshold $E_s/N_0$ of ETSI standards (as in Table 10.6 of TR 101 545-4 v1.1.1 (2014-04) Part 4:

a phase rotator configured to receive the second signal and adjust the phase of the second signal to align with the phase of the first signal to provide a phase-adjusted second signal; and a summer configured to combine the first signal with the phase-adjusted second signal to provide a composite signal.

2. The system of claim 1, wherein said de-multiplexer further comprises a first tuner and first low pass filter configured to filter the first signal and a second tuner and second low pass filter configured to filter the second signal.

3. The system of claim 1, wherein said de-spreader comprises a first delay, receiving the first signal and providing a delayed first signal, wherein the summer combines the delayed first signal with the phase-adjusted second signal.

4. The system of claim 3, further comprising a second delay, receiving the second signal and providing a delayed second signal, wherein said phase rotator is configured to receive the delayed second signal and adjust the phase of the delayed second signal to align with the phase of the first signal to provide the phase-adjusted second signal.

5. The system of claim 1, further comprising a return demodulator receiving the composite signal and demodulating the composite signal.

6. The system of claim 1, wherein the first signal has a first preamble and the second signal has a second preamble, and wherein said phase estimator estimates the phase offset between the phase of the first signal and the phase of the second signal based on a correlation of the first preamble and the second preamble.

7. The system of claim 1, wherein the first signal has first data and the second signal has second data, and wherein said phase estimator estimates the phase offset between the phase of the first signal and the phase of the second signal based on a correlation of the first data and the second data.

8. The system of claim 7, wherein the first signal and the second signal do not include a preamble.

9. A return channel system for an ultra-small aperture terminal, the system comprising:
a de-multiplexer configured to receive a spread spectrum signal via a satellite channel, said de-multiplexer separating the spread spectrum signal into a first channel having a first signal and a second channel having a second signal;
an offset compensation circuit having a phase estimator configured to determine a phase offset between a phase of the first signal and a phase of the second signal;
a phase adjustor configured to adjust the phase of the second signal to align with the phase of the first signal based on the phase offset to provide a phase-adjusted second signal; and
a summer configured to combine the first signal with the phase-adjusted second signal.

10. The system of claim 9, wherein the spread spectrum signal has low power spectral density.

11. The system of claim 9, wherein the return channel is from the ultra-small aperture terminal to a hub terminal.

12. The system of claim 9, wherein the signal is a burst-mode Time Division Multiple Access communication.

13. The system of claim 9, said de-multiplexer separating the spread spectrum signal into a first channel having a first signal, a second channel having a second signal and a third channel having a third signal, wherein said phase estimator determines a first phase offset between the phase of the first signal and the phase of the second signal and a second phase offset between the phase of the first signal and a phase of the third signal, and wherein said phase adjustor adjusts the phase of the second signal to align with the phase of the first signal based on the first phase offset to provide the phase-adjusted second signal and adjusts the phase of the third signal to align with the phase of the first signal based on the second phase offset to provide a phase-adjusted third signal.

14. The system of claim 13, wherein said summer combines the first signal with the phase-adjusted second signal and the phase-adjusted third signal to provide a composite signal.

15. The system of claim 9, wherein the first signal has a first preamble and the second signal has a second preamble, and wherein said phase estimator estimates the phase offset between the phase of the first signal and the phase of the second signal based on a comparison of the first preamble and the second preamble.

16. The system of claim 13, wherein the first signal has first data and the second signal has second data, and wherein said phase estimator estimates the phase offset between the phase of the first signal and the phase of the second signal based on a comparison of the first data and the second data.

17. The system of claim 16, wherein the first signal and the second signal do not include a preamble.

18. A method for communicating signals over a return channel for ultra-small aperture terminals, the method comprising:
receiving at a spreader an input signal and output a spread spectrum signal having multiple replicated signals with a lower power spectral density than the input signal;
receiving at a de-multiplexer the spread spectrum signal via a satellite channel, and separating by the de-multiplexer the spread spectrum signal into a first channel having a first signal and a second channel having a second signal;
estimating by an offset compensation circuit having a phase estimator, a phase offset between a phase of the first signal and a phase of the second signal;
receiving at a phase rotator the second signal and adjusting the phase of the second signal to align with the phase of the first signal to provide a phase-adjusted second signal; and
combining at a summer the first signal with the phase-adjusted second signal to provide a composite signal.

19. The method of claim 18, further comprising filtering the first signal at a first tuner and first low pass filter, and filtering the second signal at a second tuner and second low pass filter.

20. The method of claim 18, further comprising receiving the first signal at a first delay and providing a delayed first signal, and combining at the summer the delayed first signal with the phase-adjusted second signal.

21. The method of claim 20, further comprising receiving the second signal at a second delay and providing a delayed second signal, receiving at the phase rotator the delayed second signal and adjusting the phase of the delayed second signal to align with the phase of the first signal to provide the phase-adjusted second signal.

22. The method of claim 18, further comprising receiving at a return demodulator the composite signal and demodulating the composite signal.

23. The method of claim 18, wherein the first signal has a first preamble and the second signal has a second preamble, and estimating at the phase estimator the phase offset between the phase of the first signal and the phase of the second signal based on a correlation of the first preamble and the second preamble.

24. The method of claim 18, wherein the first signal has first data and the second signal has second data, and wherein said phase estimator estimates the phase offset between the phase of the first signal and the phase of the second signal based on a correlation of the first data and the second data.

25. The method of claim 24, wherein the first signal and the second signal do not include a preamble.

26. A return channel system for an ultra-small aperture terminal, the system comprising:
- a de-multiplexer configured to receive a spread spectrum signal via a satellite channel, said de-multiplexer separating the spread spectrum signal into a plurality of individual n channels each having a respective n signal;
- an offset compensation circuit having a phase estimator configured to determine a phase offset between a phase of the n=1 signal and a phase of the n signal, where both n and 1 are integers;
- a phase adjustor configured to adjust the phase of the n signal to align with the phase of the n=1 signal based on the phase offset to provide a phase-adjusted n signal; and
- a summer configured to combine the n=1 signal with the phase-adjusted n signal.

* * * * *